United States Patent
Liedes

(10) Patent No.: US 9,037,557 B2
(45) Date of Patent: May 19, 2015

(54) OPTIMISTIC, VERSION NUMBER BASED CONCURRENCY CONTROL FOR INDEX STRUCTURES WITH ATOMIC, NON-VERSIONED POINTER UPDATES

(75) Inventor: Antti-Pekka Liedes, Helsinki (FI)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/036,675

(22) Filed: Feb. 28, 2011

(65) Prior Publication Data
US 2012/0221538 A1 Aug. 30, 2012

(51) Int. Cl.
*G06F 17/30* (2006.01)

(52) U.S. Cl.
CPC ...... *G06F 17/3023* (2013.01); *G06F 17/30961* (2013.01); *G06F 17/30327* (2013.01); *G06F 17/30168* (2013.01); *G06F 17/30221* (2013.01)

(58) Field of Classification Search
USPC .......................................................... 707/704
See application file for complete search history.

(56) References Cited

U.S. PATENT DOCUMENTS

| | | | |
|---|---|---|---|
| 4,823,310 A * | 4/1989 | Grand | 1/1 |
| 6,484,172 B1 | 11/2002 | Lee et al. | |
| 6,578,026 B1 | 6/2003 | Cranston et al. | |
| 6,631,386 B1 * | 10/2003 | Arun et al. | 1/1 |
| 6,647,386 B2 | 11/2003 | Hollines, III et al. | |
| 6,760,726 B1 * | 7/2004 | Hersh | 707/704 |
| 7,072,904 B2 | 7/2006 | Najork et al. | |
| 7,293,028 B2 | 11/2007 | Cha et al. | |
| 7,577,658 B2 | 8/2009 | Graefe | |
| RE40,989 E | 11/2009 | Jain et al. | |
| 8,015,165 B2 | 9/2011 | Idicula et al. | |
| 8,045,713 B2 | 10/2011 | Lain et al. | |
| 8,666,981 B2 | 3/2014 | Liedes | |
| 2004/0107185 A1 * | 6/2004 | Najork et al. | 707/3 |
| 2005/0018853 A1 * | 1/2005 | Lain et al. | 380/277 |
| 2006/0282438 A1 * | 12/2006 | Zhou et al. | 707/100 |
| 2008/0033952 A1 * | 2/2008 | McKenney et al. | 707/8 |
| 2008/0065670 A1 * | 3/2008 | Cha et al. | 707/101 |
| 2008/0071809 A1 | 3/2008 | Lomet | |
| 2008/0313408 A1 * | 12/2008 | Blumrich et al. | 711/137 |
| 2012/0221531 A1 | 8/2012 | Liedes | |

FOREIGN PATENT DOCUMENTS

WO 02101557 A1 12/2002

OTHER PUBLICATIONS

Lanin et al., "A Symmetric Concurrent B-Tree Algorithm", IEEE, 1986, pp. 380-389.
Cha et al., "Cache-Conscious Concurrency Control of Main-Memory Indexes on Shared-Memory Multiprocessor Systems", Proceedings of the 27th BLDB Conference 2001, 10 pages.
Yehoshua Sagiv, "Concurrent Operations on B-Tree with Overtaking", ACM, 1985, pp. 28-37.
Cui Bin, "Indexing for Efficient Main Memory Processing", National University of Singapore, 2003, 208 pages.
Philip L. Lehman and S. Bing Yao "Efficient Locking for Concurrent Operations on B-Trees", ACM Transactions on Database Systems, vol. 6, No. 4, Dec. 1981, pp. 650-670.

* cited by examiner

*Primary Examiner* — Etienne Leroux
*Assistant Examiner* — Dara J Glasser
(74) *Attorney, Agent, or Firm* — Susan Murray; SVL IPLaw Edell, Shapiro & Finnan, LLC

(57) ABSTRACT

Methods, systems and computer program products for traversing a level in a search path in a tree data structure by recording a version number of a node on the search path, finding a child pointer in the node on the search path, recording a version number of a child node corresponding to the child pointer, reading a version number of the node on the search path, comparing the recorded version number of the node to the read version number of the node, reading at least one child pointer in the node and comparing the read child pointer to an address of the child node.

18 Claims, 3 Drawing Sheets

OPTIMISTIC, VERSION NUMBER BASED CONCURRENCY CONTROL FOR INDEX STRUCTURES WITH ATOMIC, NON-VERSIONED POINTER UPDATES

BACKGROUND OF THE INVENTION

1. Field of the Invention

The present invention relates to information management systems and more particularly to an optimistic version number based concurrency control for memory-resident index structures.

2. Description of the Related Art

Database systems use indexes for efficient access to specific data items. Different tree structures, such as B-trees and tries (radix trees) are a method of choice for the indexes. In order to provide safe access by multiple processors at the same time, index trees employ a concurrency control method to protect different parts of the tree from being read or written by a processor while another processor is writing to the same place at the same time.

Concurrency control is important for multiprocessor scalability of an index structure. Typically, concurrency control entails the use of latches to lock a part of the index tree, usually a single node, against reading, writing, or both. The best scalability is attained by concurrency control methods that have a minimum amount of latch collisions, i.e., the same latch being wanted by two or more processors at the same time.

In certain index structures, mainly different trie (radix tree) variants (and also in B-trees), at times only a single pointer in a node is to be updated. This update itself is atomic: if the pointer value is both read and updated at the same time, the reader either gets the whole old or the whole new value. In the optimistic, latch-free index traversal ("OLFIT") scheme, updating a single pointer value in a node would require a version number update on the node, which in turn causes any concurrent read operation to conflict and retry. With nodes typically containing at least a dozen siblings, all the searches going to the siblings other than the one whose pointer is being updated will get false conflicts, potentially causing at least ten times more false than actual conflicts.

Therefore, there is a need for an efficient index structure and a concurrency control scheme that optimize database management systems against the high cost of invalidating paths that are not updated in a multiprocessing environment.

BRIEF SUMMARY OF THE INVENTION

Embodiments of the present invention provide a method, system and computer program product for traversing a level in a search path in a tree data structure by recording a version number of a node on the search path, finding a child pointer in the node on the search path, recording a version number of a child node corresponding to the child pointer, reading a version number of the node on the search path, comparing the recorded version number of the node to the read version number of the node, reading at least one child pointer in the node and comparing the read child pointer to an address of the child node.

A data processing system for traversing a level in a search path in a tree data structure includes a host computer with processor and memory, a query processing system executing in the host computer and monitoring queries of a database in a main memory. The system can include a concurrency control module coupled to the query processing system, the module comprising program code for recording a version number of a node on the search path, for finding a child pointer in the node on the search path, for recording a version number of a child node corresponding to the child pointer, for reading a version number of the node on the search path, for comparing the recorded version number of the node to the read version number of the node, and for reading the child pointer in the node and comparing the read child pointer to an address of the child node.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to traversing a level in a search path in a tree data structure and provide a novel and non-obvious method, system and computer program product for traversing a level in a search path in a tree data structure.

Figure 1:
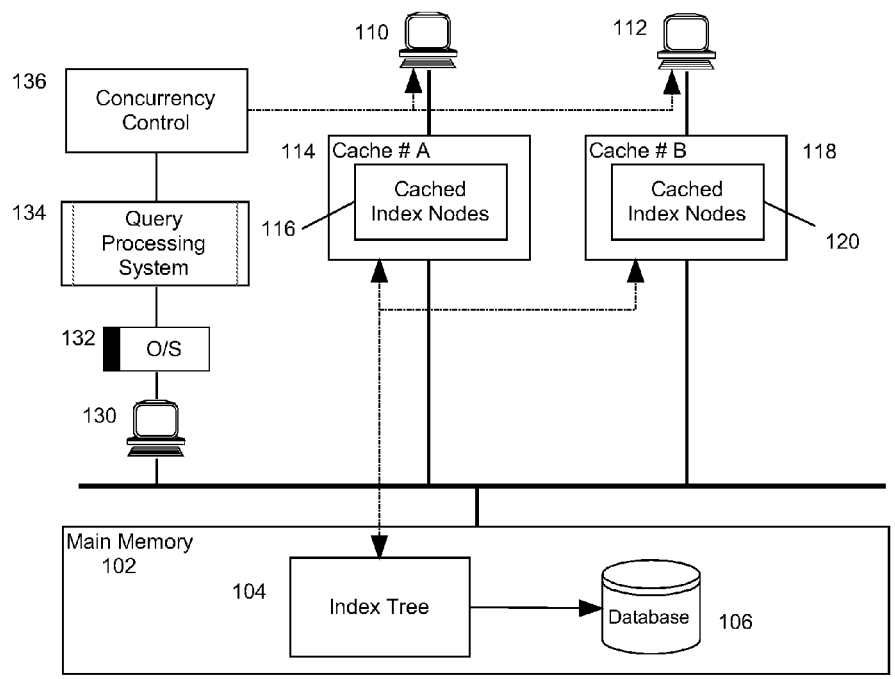
FIG. 1 is a data processing system configured for traversing a level in a search path in a tree data structure.

In further illustration, FIG. 1 is a data processing system implementing an optimistic latch-free index traversal (OLFIT) scheme in accordance with the present invention, which takes advantage of the "optimistic" characteristic of database transactions in the sense that the majority of database transactions do not conflict. FIG. 1 schematically shows a data processing system configured for traversing a level in a search path in a tree data structure. The system can include a host computer 130 with at least one processor and memory. The host computer 130 can be configured for communicatively coupling to a main memory 102 over a data bus or communications network. The main memory 102 can include database 106 and an index structure 104, usually a tree, for efficiently managing the database 106. The host computer 130 can include an operating system 132 executing by one or more of the processors in the memory of the host computer 130. A query processing system 134, in turn, can be hosted by the operating system 132. The query processing system 134 can include functionality sufficient to direct queries of the index tree 104 and database 106 of main memory 102. In this embodiment, multiple processes are attempting to access main memory 102. For example, Cache # A 114 (or cache # B 118) is provided for processing element # A 110 (or processing element # B 112) to store frequently accessed index nodes 116 (or 120) so as to improve the overall memory access time performance.

Notably a concurrency control unit 136 can be coupled to the query processing system 134 and can execute in the memory by one or more of the processors of the host computer 130. In embodiments, concurrency control unit 136, preferably implemented in software, is provided to coordinate processing elements or threads so as to maintain the consistency of processing without too frequent invalidation of cache entries. In embodiments, the concurrency control unit 136 provides control necessary for latch-free traversal of index nodes based on optimistic index concurrency control. Concurrency control unit 136 can include program code enabled to record a version number of a node on a search path in a tree structure. Concurrency control unit 136 further can include program code to find a child pointer in the node on the search path and to record a version number of a child node corresponding to the child pointer. Concurrency control unit 136 yet further can include program code to read a version number of the node on the search path and to compare the recorded number of the node to the read version number of the node. Concurrency control unit 136 finally can include program code to read the child pointer in the node and to compare the read child pointer to an address of the child node.

Figure 2:
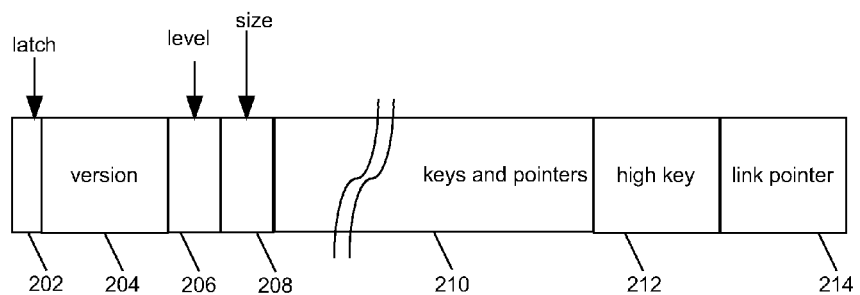
FIG. 2 is a schematic illustration of the structure of a B+-tree index node used by the OLFIT scheme according to an embodiment of the present invention.

In further illustration, FIG. 2 schematically shows the structure of a B+-tree index node used by the OLFIT scheme according to an embodiment of the present invention. Stored in each index node are node content information and concurrency control information. The node contents include keys and pointers to other nodes 210 for accessing the database. The concurrency control information includes a latch 202 for governing concurrent access to a node and a version number 204 for indicating the updated status of the node contents. The node contents further include a level 206 specifying the level number of the node in the tree index, a size 208 for specifying the number of entries in the node, a high key 212 and a link pointer 214. The high key of a node denotes the upper bound of the key values in the node, and the link pointer is a pointer pointing to the right sibling of the node at the same level. The link pointer provides an additional path for reaching a node, and the high key determines whether to follow the link pointer or not.

The concurrency control module 136 can include program code enabled upon execution in the memory of the host computer 130 to record a version number of a node in a search path into a memory register (e.g., register 1 of the general purpose computer) and to check if the version number is an odd number value. Additionally, the program code of the concurrency control module 136 can find a child pointer in the node on the search path by reading and processing the content of that node, which location of the child pointer can be recorded in a memory register (e.g., register 2 of the general purpose computer). The program code of the concurrency control module 136 can read version number of parent node to check if the parent's node version is different than the recorded node version stored in register 1 or if the node's version is odd and if so, restart the traversal of the search path. The program code of the concurrency control module 136 can record the child's node version in a memory register (e.g., register 3 of the general purpose computer), read the parent's node version number, determine if the read node version number is different for the recorded version number in register 1 and if so, restart the traversal of the search path. Otherwise, the program code of the concurrency control module 136 can read the child pointer in the node and compare the read child pointer to an address of the child node. Thereafter, the program code of the concurrency control module 136 can optionally perform a node update without changing the version number of the node, which includes latching the node, atomically updating the child pointer and unlatching or releasing the latched node. The program code of the concurrency control module 136 further can determine if the child pointer and the address of the child node are equal or optionally unequal. If the child pointer and the address of the child node are equal, the program code of the concurrency control module 136 further can determine whether the read node version number and the recorded version number in register 1 are equal and if so, the process can proceed to another level in the search path. In embodiments, the program code of the concurrency control module to proceed to another level in the search path can include proceeding to a leaf level in the search path. Finally, the program code of the concurrency control module 136 can determine that the child pointer and the address of the child node are not equal and restart the traversal of the search path.

Figure 3:
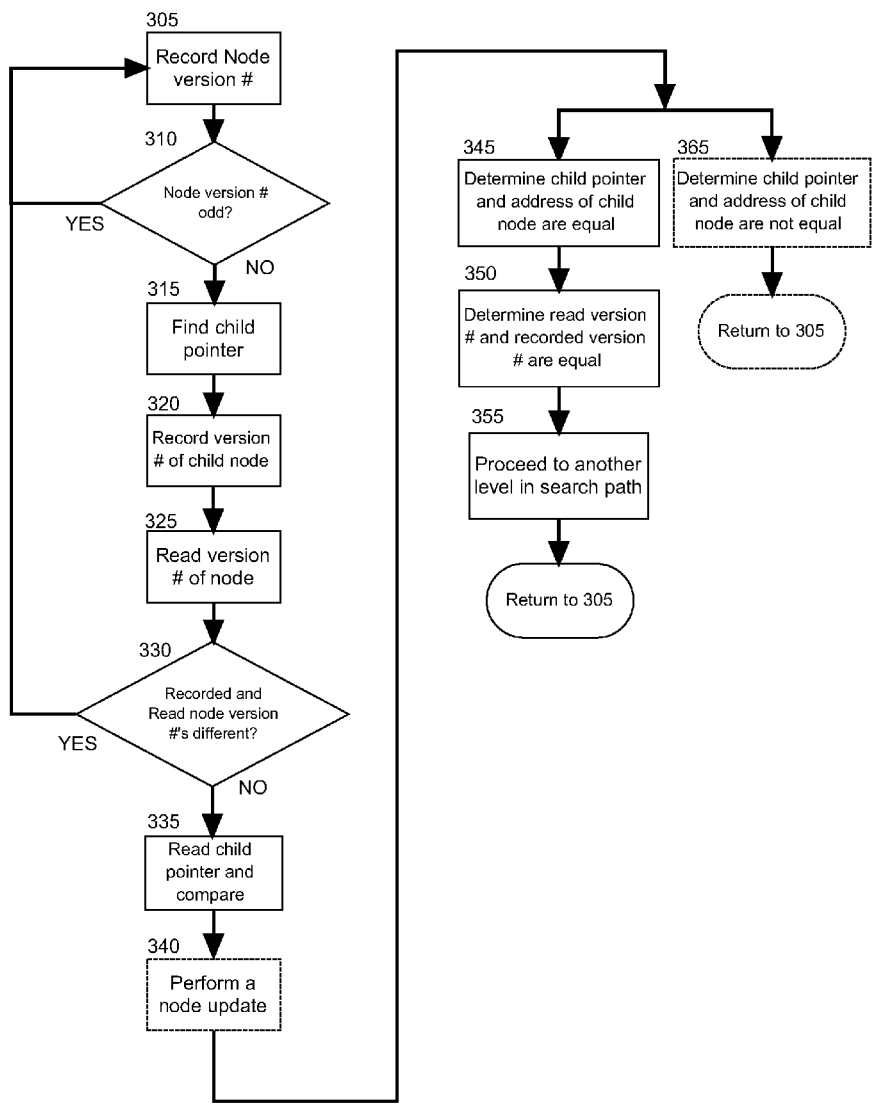
FIG. 3 is a flow chart illustrating a process for traversing a level in a search path in a tree data structure.

In even yet further illustration of the operation of the concurrency control module 136, FIG. 3 is a flow chart illustrating a process for concurrency control of traversing a level in a search path of a tree structure. Beginning in block 305, a version number of a node in a search path can be recorded into a memory register (e.g., register 1 of the general purpose computer) and the version number can be checked to determine whether it is an odd number value in decision block 310. In block 315, a child pointer can be found in the node on the search path by reading and processing the content of that node, and in block 320 a location of the child pointer can be recorded in a memory register (e.g., register 2 of the general purpose computer). In block 325, the version number of parent node can be read and in decision block 330, a determination of whether the parent's node version is different than the recorded node version stored in register 1 or if the node's version is odd and if so, the traversal of the search path can be restarted. Otherwise, in block 335, the child pointer in the node can be read and compared to an address of the child node. Thereafter, in block 340, a node update can be optionally performed without changing the version number of the node, which node update can include latching the node, atomically updating the child pointer and unlatching or releasing the latched node. In block 345, concurrency control module 136 further can determine if the child pointer and the address of the child node are equal or optionally unequal. When the child pointer and the address of the child node are equal, then in block 350, the concurrency control module 136 further can determine whether the read node version number and the recorded version number in register 1 are equal and if so, in block 355, the process can proceed to another level in the search path. Finally, in block 365, the concurrency control module 136 can determine that the child pointer and the address of the child node are not equal and restart the traversal of the search path at block 305.

In embodiments, more comprehensive operations, such as node splits, can be performed using a node splitting algorithm, which can include obtaining a latch onto the node, increasing the version number of the node by one to an odd numerical value, performing appropriate changes onto the node, increasing the version number of the node by one to an even value and releasing the latch onto the node.

Figure 4:
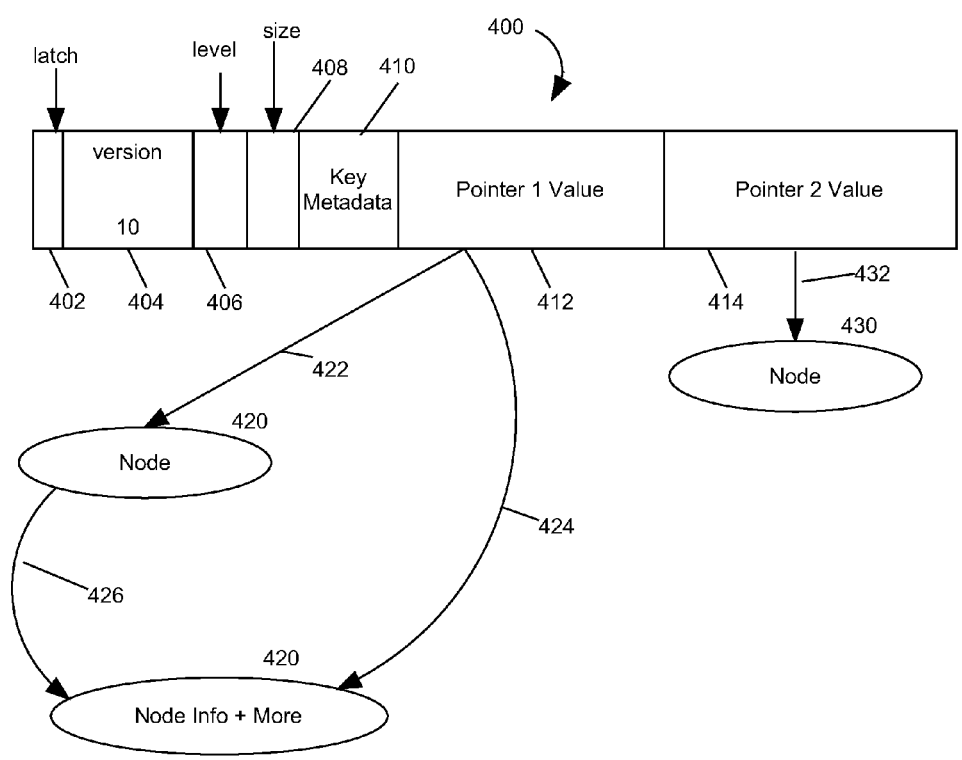
FIG. 4 is a diagram illustrating a process for traversing a level in a search path in a tree data structure.

FIG. 4 is a diagram illustrating a process for traversing a level in a search path in a tree data structure. FIG. 4 illustrates a trie/Radix tree node 400 that includes pointers to other nodes 412, 414 for accessing the database. The concurrency control information includes a latch 402 for governing concurrent access to a node and a version number 404 (e.g., 10) for indicating the updated status of the node contents. The node contents further include a level 406 specifying the level number of the node in the tree index, a size 408 for specifying the number of entries in the node and key metadata 410. In embodiments, key metadata 410 is used to determine which key value (or part of a key) each of the pointers 412 and 414 represents. In this embodiment, two nodes 420 and 430 are illustrated having pointer links 422 and 432 respectively. In this example, a key is to be inserted in node 420, which in turn causes the size of node 420 to increase thereby forcing the node 420 to be moved to a new memory location without a version number increment, as indicated by the arrow 426. In this way, all the other paths from node 400 in which a single pointer is being updated remain valid all the time. As nodes will typically contain dozens of siblings, the "update path" can be narrowed down where concurrent reads would normally conflict with the update by at least one order of magnitude. In this embodiment, a new pointer value 412 is designated by the new link 424 to node 420, which is sometimes referred to as expanding the child node 420 or re-writing the pointer/link value 412 without updating the node version number 404.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. A computer implemented method for traversing a level in a search path in a tree structure, comprising:
    recording a version number of a node on the search path;
    finding a child pointer in the node on the search path, wherein the node includes a plurality of child pointers each forming a path to a corresponding child node;
    reading a version number of the node on the search path;
    comparing the recorded version number of the node to the read version number of the node;
    reading the child pointer in the node and comparing the read child pointer to an address of the corresponding child node;
    performing an update to change a selected child pointer of the node without changing the version number of the node to invalidate the path formed by the selected child pointer being updated and enable paths formed by other child pointers of the node to remain valid, wherein the update is performed in response to the corresponding child node of the selected child pointer having a new location in memory and the updated child pointer forms a path to the corresponding child node in the new location;
    proceeding to another level in the search path from the updated node along the valid path formed by one of the other child pointers in response to determining that the version number of the updated node remains unchanged and the search path including that valid path based on determining that the address of the corresponding child node of the one other child pointer remains unchanged; and
    restarting the traversal of the search path in response to the search path including the invalidated path based on the read child pointer not being equal to the address of the corresponding child node.

2. The method of claim 1, wherein performing the update further comprises:
    latching the node;
    atomically updating the selected child pointer in the node; and
    releasing the node from the latching.

3. The method of claim 2, wherein proceeding to another level in the search path further comprises:
    determining that the one other child pointer and the address of the corresponding child node are equal; and
    determining that the read version number of the node and the recorded version number of the node are equal.

4. The method of claim 3, wherein proceeding to another level in the search path includes proceeding to a leaf level in the search path.

5. The method of claim 2, further comprising:
    restarting the traversal of the search path in response to the one other child pointer and the address of the corresponding child node being equal and the read version number of the node and the recorded version number of the node not being equal.

6. A computer program product for traversing a level in a search path in a tree structure, the computer program product comprising:
    a tangible computer readable memory device having computer readable program code stored thereon, the computer readable program code comprising:
        computer readable program code for recording a version number of a node on the search path;
        computer readable program code for finding a child pointer in the node on the search path, wherein the node includes a plurality of child pointers each forming a path to a corresponding child node;
        computer readable program code for reading a version number of the node on the search path;
        computer readable program code for comparing the recorded version number of the node to the read version number of the node;
        computer readable program code for reading the child pointer in the node and comparing the read child pointer to an address of the corresponding child node;
        computer readable program code for performing an update to change a selected child pointer of the node without changing the version number of the node to invalidate the path formed by the selected child pointer being updated and enable paths formed by other child pointers of the node to remain valid, wherein the update is performed in response to the corresponding child node of the selected child pointer having a new location in memory and the updated child pointer forms a path to the corresponding child node in the new location;
        computer readable program code for proceeding to another level in the search path from the updated node along the valid path formed by one of the other child pointers in response to determining that the version number of the updated node remains unchanged and the search path including that valid path based on determining that the address of the corresponding child node of the one other child pointer remains unchanged; and
        computer readable program code for restarting the traversal of the search path in response to the search path including the invalidated path based on the read child pointer not being equal to the address of the corresponding child node.

7. The computer program product of claim 6, wherein the computer readable program code for performing the update further comprises:
  computer readable program code for latching the node;
  computer readable program code for atomically updating the selected child pointer in the node; and
  computer readable program code for releasing the node from the latching.

8. The computer program product of claim 7, wherein the computer readable program code for proceeding to another level in the search path further comprises:
  computer readable program code for determining that the one other child pointer and the address of the corresponding child node are equal; and
  computer readable program code for determining that the read version number of the node and the recorded version number of the node are equal.

9. The computer program product of claim 8, wherein the computer readable program code for proceeding to another level in the search path includes computer readable program code for proceeding to a leaf level in the search path.

10. The computer program product of claim 7, further comprising:
  computer readable program code for restarting the traversal of the search path in response to the one other child pointer and the address of the corresponding child node being equal and the read version number of the node and the recorded version number of the node not being equal.

11. A data processing system comprising:
  a host computer with processor and memory;
  a query processing system executing in the host computer and monitoring queries of a database in a main memory; and
  a concurrency control module coupled to the query processing system, the module comprising program code for:
    recording a version number of a node on the search path;
    finding a child pointer in the node on the search path, wherein the node includes a plurality of child pointers each forming a path to a corresponding child node;
    reading a version number of the node on the search path;
    comparing the recorded version number of the node to the read version number of the node;
    reading the child pointer in the node and comparing the read child pointer to an address of the corresponding child node;
    performing an update to change a selected child pointer of the node without changing the version number of the node to invalidate the path formed by the selected child pointer being updated and enable paths formed by other child pointers of the node to remain valid, wherein the update is performed in response to the corresponding child node of the selected child pointer having a new location in memory and the updated child pointer forms a path to the corresponding child node in the new location;
    proceeding to another level in the search path from the updated node along the valid path formed by one of the other child pointers in response to determining that the version number of the updated node remains unchanged and the search path including that valid path based on determining that the address of the corresponding child node of the one other child pointer remains unchanged; and
    restarting the traversal of the search path in response to the search path including the invalidated path based on the read child pointer not being equal to the address of the corresponding child node.

12. The system of claim 11, wherein the program code of the concurrency control module for performing the update is further enabled to latch the node, to atomically update the selected child pointer in the node and to release the node from the latching.

13. The system of claim 12, wherein the program code of the concurrency control module for proceeding to another level of the search path is further enabled to determine that the one other child pointer and the address of the corresponding child node are equal, and to determine that the read version number of the node and the recorded version number of the node are equal.

14. The system of claim 13, wherein the program code of the concurrency control module to proceed to another level in the search path includes program code to proceed to a leaf level in the search path.

15. The system of claim 12, wherein the program code of the concurrency control module is further enabled to:
  restart the traversal of the search path in response to the one other child pointer and the address of the corresponding child node being equal and the read version number of the node and the recorded version number of the node not being equal.

16. The method of claim 1, wherein the version number indicates splitting of the node.

17. The computer program product of claim 6, wherein the version number indicates splitting of the node.

18. The system of claim 11, wherein the version number indicates splitting of the node.

\* \* \* \* \*